United States Patent
Aiba et al.

(10) Patent No.: US 9,127,176 B2
(45) Date of Patent: Sep. 8, 2015

(54) COATING COMPOSITION AND METHOD FOR FORMING COATING FILM USING SAME

(75) Inventors: Takeshi Aiba, Atsugi (JP); Takeshi Nomoto, Atsugi (JP); Fumiaki Nakao, Isehara (JP)

(73) Assignee: NISSAN MOTOR CO., LTD., Yokohama-shi, Kanagawa (JP)

( * ) Notice: Subject to any disclaimer, the term of this patent is extended or adjusted under 35 U.S.C. 154(b) by 104 days.

(21) Appl. No.: 14/131,999

(22) PCT Filed: Jun. 28, 2012

(86) PCT No.: PCT/JP2012/066605
§ 371 (c)(1),
(2), (4) Date: Jan. 10, 2014

(87) PCT Pub. No.: WO2013/008640
PCT Pub. Date: Jan. 17, 2013

(65) Prior Publication Data
US 2014/0151230 A1    Jun. 5, 2014

(30) Foreign Application Priority Data
Jul. 13, 2011    (JP) .................................. 2011-154666

(51) Int. Cl.
C09D 5/44    (2006.01)
C08G 18/64    (2006.01)
C09D 175/04    (2006.01)
C08G 18/80    (2006.01)
C08G 59/40    (2006.01)

(52) U.S. Cl.
CPC ............ C09D 5/4473 (2013.01); C08G 18/643 (2013.01); C08G 18/8019 (2013.01); C08G 59/4028 (2013.01); C09D 5/443 (2013.01); C09D 5/4457 (2013.01); C09D 175/04 (2013.01); C08G 2150/90 (2013.01)

(58) Field of Classification Search
CPC ............ C08G 18/643; C08G 59/4028; C08G 18/8019; C08G 2150/90; C09D 175/04; C09D 5/4457; C09D 5/4473; C09D 5/443
See application file for complete search history.

(56) References Cited

U.S. PATENT DOCUMENTS

| 4,987,178 A | 1/1991 | Shibata et al. |
| 5,126,413 A | 6/1992 | Kamikado et al. |
| 5,212,216 A | 5/1993 | Hattori et al. |
| 5,225,461 A | 7/1993 | Kamikado et al. |
| 5,491,183 A | 2/1996 | Yamada et al. |
| 6,492,027 B2 | 12/2002 | Nishiguchi et al. |
| 6,660,385 B2 | 12/2003 | Nishiguchi et al. |
| 7,045,575 B2 | 5/2006 | Sawada et al. |

FOREIGN PATENT DOCUMENTS

| JP | 61233068 A | 10/1986 |
| JP | 291169 A | 3/1990 |
| JP | 2269164 A | 11/1990 |
| JP | 374474 A | 3/1991 |
| JP | 7126558 A | 5/1995 |
| JP | 2002060454 A | 2/2002 |
| JP | 2003012764 A | 1/2003 |
| JP | 2003082498 A | 3/2003 |
| JP | 2003313495 A | 11/2003 |
| JP | 2004339524 A | 12/2004 |
| JP | 2012116953 A | 6/2012 |

*Primary Examiner* — Kishor Mayekar
(74) *Attorney, Agent, or Firm* — Young Basile (57) ABSTRACT

A cationic electrodeposition coating is provided having excellent covering power (clearance application properties), edge anticorrosion properties, and finish properties. The cationic electrodeposition coating composition comprises a specific amino-group-containing epoxy resin; blocked polyisocyanate obtained by reacting an active hydrogen-containing component containing propylene glycol, and a polyisocyanate compound; and 0.1-20 mass parts of a cationic electrodepositing gelled microparticulate polymer obtained by crosslinking an acrylic copolymer containing hydrolyzable alkoxysilane groups and cationic groups, per a total of 100 mass parts of the solids fraction of the amino-group-containing epoxy resin and the blocked polyisocyanate compound.

6 Claims, 1 Drawing Sheet

FIG. 1

FIG. 2

COATING COMPOSITION AND METHOD FOR FORMING COATING FILM USING SAME

CROSS REFERENCE TO RELATED APPLICATION

The present application claims priority to Japanese Patent Application No. 2011-154666, filed Jul. 13, 2011 and incorporated herein in its entirety.

TECHNICAL FIELD

The present invention relates to a paint composition and a method for forming a coating film using the same.

BACKGROUND

Figure 1:
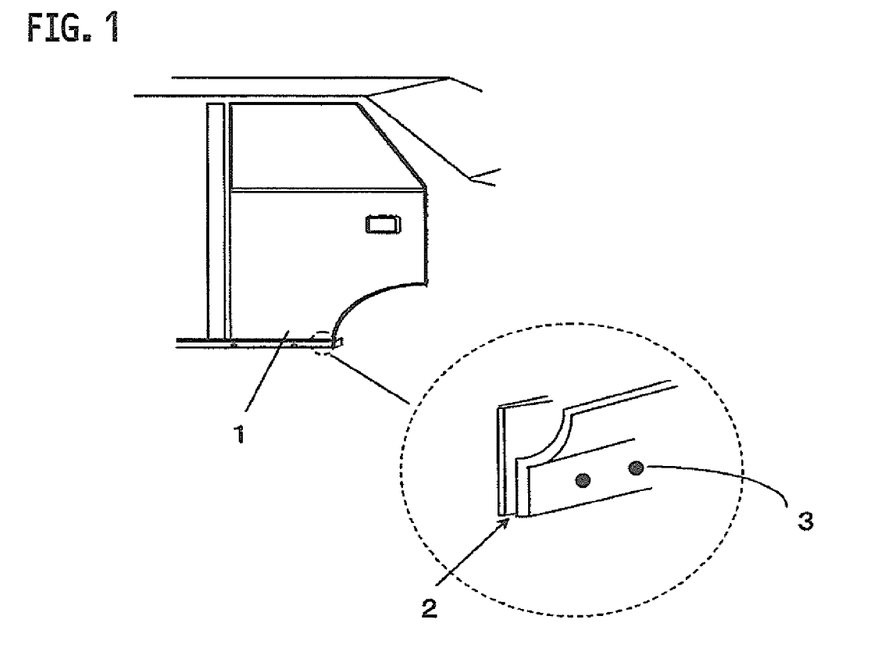
FIG. 1 shows a model view of a gap (clearance) part in an automobile body.

Since cationic electrodeposition paints have excellent coating workability and good anticorrosion properties of a coating film, they are used widely as a primer for electroconductive metal products such as automobile bodies, for which these performances are required. Recently, however, strength up of automobile bodies is devised from the viewpoint of improving safety against collision, and, since a reinforcing material is furthermore added to a member welded by spot welding, objects to be coated for a structure having a complex gap part are frequently utilized (for example, see FIG. 1). Since such structure has a gap part (hereinafter, it may be called "clearance") of from 50 μm to 600 μm and a current density (mA/cm$^2$) lowers in electrodeposition coating, a coating film tends to precipitate hardly and to lead to non-coating, and anticorrosion properties may be lowered.

Figure 2:
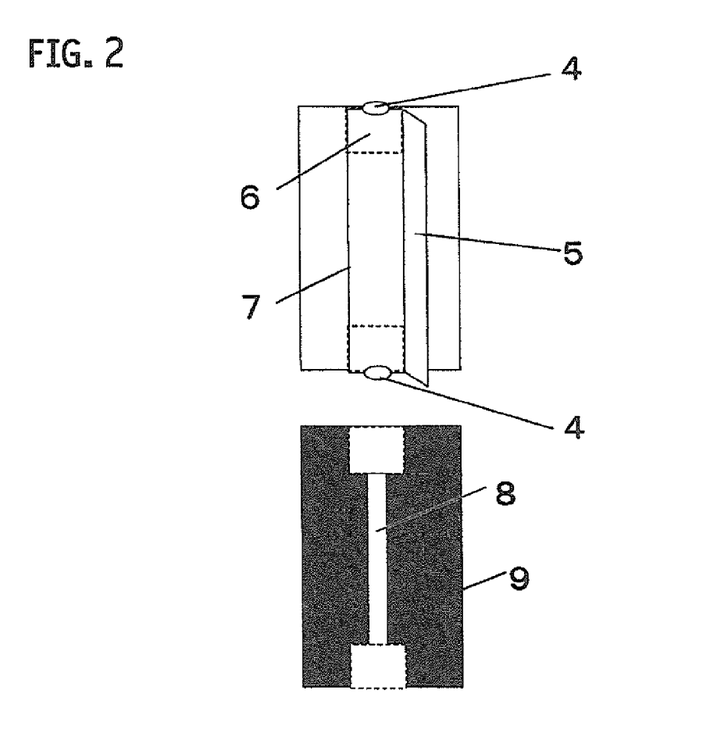
FIG. 2 is a "double-laminated test sheet" for clearance coating properties.

Therefore, coating conditions are devised for securing the film thickness (μm) in the gap part, but, if just performing coating while raising the coating voltage in electrodeposition, an opening 5 of a gap structure shown in FIG. 2 is covered and a throwing property 6 in clearance coating properties cannot be obtained.

Further, when coating is performed while raising the coating voltage, there are such problems that outer panel finish properties deteriorate and outer panel thickness (μm) of an object to be coated becomes thicker to increase the use amount of the coating. Therefore, a cationic electrodeposition paint having good throwing properties (hereinafter, it may be called clearance coating properties) in an object to be coated having a gap part is wanted.

Conventionally, there is disclosed a method for forming a coating film in a gap part, characterized in that, in coating of a cationic electrodeposition paint, the maximum value (I) of a current density is expressed within 5 seconds from the start of power supply, and that a time period having a current density (0.5 I) being ½ or more of the maximum value (I) of the current density is within 5 seconds (see Japanese Patent Application Laid-Open Publication No. 2003-82498). According to the electrodeposition paint composition described in these methods for forming a coating film, however, although clearance coating properties are improved by raising a resistance value of a coating film, finishing properties deteriorate. Furthermore, anticorrosion properties of an end face are insufficient. From such a background, a paint composition that satisfies clearance coating properties, finishing properties and anticorrosion properties of an end face is wanted.

SUMMARY

The problem to be solved is to find a paint composition that is excellent in clearance coating properties and finishing properties in a gap part and in anticorrosion properties of an end face (hereinafter, it may be called "edge anticorrosion properties"), and to find a method for forming a coating film using the same.

As the result of hard examinations for solving the above-mentioned problem to be solved, the present inventor found that it was solved by a cationic electrodeposition paint composition including a specific amino group-containing epoxy resin (A), a blocked polyisocyanate (B) obtained by reacting a polyisocyanate compound and an active hydrogen-containing component containing propylene glycol, and cationic electrodepositing gelled microparticulate polymer (C), to accomplish the present invention.

That is, since a combination of the specific amino group-containing epoxy resin (A) in which a modified epoxy resin (a1) and a polycaprolactone polyol compound (a2) are adjusted, the (B) component and the (C) component could be devised, both clearance coating properties and finishing properties, and anticorrosion properties of an end face could be achieved simultaneously.

That is, the present invention relates to a cationic electrodeposition paint composition including the amino group-containing epoxy resin (A), the blocked polyisocyanate (B) obtained by reacting a polyisocyanate compound and an active hydrogen-containing component containing propylene glycol, and a cationic electrodepositing gelled microparticulate polymer (C), in which the amino group-containing epoxy resin (A) is a polyol-modified amino group-containing epoxy resin obtained by reacting the polycaprolactone polyol compound (a2) and an amino group-containing compound (a3) with the modified epoxy resin (a1), the modified epoxy resin (a1) is a resin obtained by adding caprolactone (a12) to a hydroxyl group-containing epoxy resin (a11), the cationic electrodepositing gelled microparticulate polymer (C) is a polymer obtained by water-dispersing an acrylic copolymer containing a hydrolyzable alkoxysilane group and a cationic group and performing an intra-particle crosslinking, and the blending ratio of the cationic electrodepositing gelled microparticulate polymer (C) in the cationic electrodeposition paint composition is, in terms of solid content ratio, from 0.1 to 20 parts by mass relative to the total 100 parts by mass of the amino group-containing epoxy resin (A) and the blocked polyisocyanate compound (B).

By using the cationic electrodeposition paint composition of the present invention, thermal flow properties in baking and the state of a precipitated coating film become the optimum, which makes it possible to overcome matters that has been considered to be difficult and to obtain coated articles which are excellent in clearance coating properties, finishing properties and edge anticorrosion properties. Further, in automobile bodies, parts uncoated with a cationic electrodeposition paint film can be reduced as compared with conventional cases, and the coating film can be formed on an end face and inside a gap part to improve anticorrosion properties.

BRIEF DESCRIPTION OF DRAWINGS

The description herein makes reference to the accompanying drawings wherein like reference numerals refer to like parts throughout the several views, and wherein.

DESCRIPTION OF EMBODIMENTS

The present invention relates to a cationic electrodeposition paint composition that can give good throwing properties (clearance coating properties) in objects to be coated having a gap (clearance) part such as automobile bodies.

The gap (clearance) part of automobile bodies etc. is a very narrow joint of from 50 to 600 for which degrease and surface treatments are hardly performed and almost all thereof is in a state of an untreated steel sheet. In addition, a cationic electrodeposition paint composition also enters hardly into it, and, furthermore, since an electric current hardly flows in electrodeposition, the coating thereof may not be performed. For an object to be coated having such a gap (clearance) part, a special cationic electrodeposition paint composition needs to be prepared. Hereinafter, details will be described.

The cationic electrodeposition paint composition of the present invention includes an amino group-containing epoxy resin (A) that is obtained by reacting a polycaprolactone polyol compound (a2) and an amino group-containing compound (a3) with a modified epoxy resin (a1) obtained by adding caprolactone (a12) to a hydroxyl group-containing epoxy resin (a11). Hereinafter, details will be described.

Here, the amino group-containing epoxy resin (A) fulfills a function of optimizing thermal flow properties in baking and the state of a precipitated coating film.

Hydroxyl Group-Containing Epoxy Resin

In the present invention, the hydroxyl group-containing epoxy resin is a compound that has two or more hydroxyl groups and two or more epoxy groups per one molecule. The epoxy equivalent of the hydroxyl group-containing epoxy resin is in the range from 180 to 2,500, preferably from 200 to 2,000, furthermore preferably from 400 to 1,500. Further, the number average molecular weight of the hydroxyl group-containing epoxy resin is preferably at least 280, particularly in the range from 300 to 4,000, furthermore particularly from 330 to 2,000. As the hydroxyl group-containing epoxy resin, particularly, a resin that is obtained by the reaction of a polyphenol compound and epihalohydrin is preferable. Consequently, the hydroxyl group-containing epoxy resin (a11) fulfills the function of anticorrosion properties.

Here, the term "number average molecular weight" was obtained, according to the method described in JIS K 0124-83, from a calibration curve between reference polystyrene and chromatogram obtained with an RI refractometer using tetrahydrofuran for GPC as an eluent at 40° and flow rate of 1.0 ml/min while using four columns of "TSK GEL4000HXL," "TSK GEL3000HXL," "TSK GEL2500HXL" and "TSK GEL2000HXL" (manufactured by Tosoh Corporation) as separation columns.

Examples of polyphenol compounds used for forming the epoxy resin include bis(4-hydroxyphenyl)-2,2-propane [bisphenol A], bis(4-hydroxyphenyl)methane [bisphenol F], bis(4-hydroxycyclohexyl)methane [hydrogenated bisphenol F], 2,2-bis(4-hydroxycyclohexyl)propane [hydrogenerated bisphenol A], 4,4'-dihydroxybenzophenone, bis(4-hydroxyphenyl)-1,1-ethane, bis(4-hydroxyphenyl)-1,1-isobutane, bis(4-hydroxy-2 or 3-tert-butylphenyl)-2,2-propane, bis(2-hydroxynaphthyl)methane, tetra(4-hydroxyphenyl)-1,1,2,2-ethane, 4,4'-dihydroxydiphenylsulfone, phenol novolac, cresol novolac, etc.

As the epoxy resin obtained from the reaction of a polyphenol compound and epichlorohydrin, among others, a resin induced from bisphenol A and represented by a general formula (1) below:

[Chemical formula 1]

(1)

wherein n is represented from 1 to 5, is suitable from the reason of finishing properties and anticorrosion properties.

Examples of such hydroxyl group-containing epoxy resins that are commercially available include those on the market under trade names of jER828EL, jER1001, jER1002, jER1004 and jER1007 manufactured by Japan Epoxy Resin Co., Ltd.

Caprolactone

As caprolactone, γ-caprolactone, ε-caprolactone, δ-caprolactone, lactone, valerolactone etc. are mentioned, and, in particular, ε-caprolactone is suitable from the reason of optimization of thermal flow properties.

Modified Epoxy Resin

The modified epoxy resin (a1) can be obtained by an addition reaction of the above-mentioned hydroxyl group-containing epoxy resin (a11) and caprolactone (a12). The addition reaction itself can be performed by a known method. Specifically, for example, the blending ratio of caprolactone in the addition reaction can be set in the range generally from 1 to 15 mol per 1 equivalent of the hydroxyl group of the hydroxyl group-containing epoxy resin, preferably from 1 to 10 mol, furthermore preferably from 1 to 7 mol. In the addition reaction, the modified epoxy resin (a1) can be manufactured, for example, by heating the hydroxyl group-containing epoxy resin (a11) and caprolactone (a12) at a temperature of from 100 to 250° C. for from about 1 to about 15 hours under the existence of a catalyst such as a titanium compound such as tetrabutoxytitanium or tetrapropoxytitanium; an organic tin compound such as tin octylate, dibutyl tin oxide or dibutyl tin laurate; or a metal compound such as stannous chloride.

The obtained modified epoxy resin (a1) is of a number average molecular weight in the range from 700 to 5,000, preferably from 1,000 to 4,500. The modified epoxy resin (a1) is extremely useful for achieving simultaneously chipping resistance and resistance to warm salt water immersion.

Polycaprolactone Polyol Compound

As the polycaprolactone polyol compound (a2), a compound represented by a general formula (2) or a general formula (3) below can be employed.

[Chemical formula 2]

formula (2)

wherein $R^1$ represents an alkyl group having from 1 to 6 carbons, "a" represents an integer of from 1 to 20, and "b" represents an integer of from 1 to 20.

[Chemical formula 3]

formula (3)

wherein $R^2$ represents an alkyl group having from 1 to 6 carbons, "c" represents an integer of from 1 to 20, "d" represents an integer of from 1 to 20, and "e" represents an integer of from 1 to 20.

The polycaprolactone polyol compound (a2) has a weight-average molecular weight in the range from 300 to 2,000, preferably from 500 to 1,500.

As commercially available polycaprolactone polyol compounds (a2), Placcel 205, Placcel 208, Placcel 210, Placcel 212, Placcel 220, Placcel 305, Placcel 308 and Placcel 312 (Daicel Chemical Industries, Ltd.) etc. are mentioned.

Such polycaprolactone polyol compound (a2) possesses at the same time high compatibility for the hydroxyl group-containing epoxy resin (a1) based on a compound having a plurality of active hydrogen groups, high plasticizing performance based on caprolactone and high reactivity by an end hydroxyl group, and is useful for improving chipping resistance and resistance to warm salt water immersion of a coating film to be obtained.

Amino Group-Containing Compound

In the present invention, the amino group-containing compound (a3) that is subjected to a reaction with the modified epoxy resin (a1) and the polycaprolactone polyol compound (a2) in order to obtain the amino group-containing epoxy resin (A) is a cationic property-giving component for introducing an amino group into the modified epoxy resin (a1) to cationize the modified epoxy resin (a1), and a compound containing at least one active hydrogen that reacts with an epoxy group is used.

Examples of the amino group-containing compound (a3) that is used for the purpose include mono- or di-alkylamine such as monomethylamine, dimethylamine, monoethylamine, diethylamine, monoisopropylamine, diisopropylamine, monobutylamine and dibutylamine; alkanolamines such as monoethanolamine, diethanolamine, mono(2-hydroxypropyl)amine, di(2-hydroxypropyl)amine, monomethylaminoethanol and monoethylaminoethanol; alkylenepolyamine such as ethylenediamine, propylenediamine, butylenediamine, hexamethylenediamine, tetraethylenepentamine, pentaethylenehexamine, diethylaminopropylamine, diethylenetriamine and triethylenetetramine, and ketiminized compounds of these polyamines; alkyleneimines such as ethyleneimine and propyleneimine; cyclic amines such as piperazine, morpholine and pyrazine; etc. Among the above-mentioned amines, an amine obtained by ketiminizing a primary amine can be used in combination.

Such amino group-containing compound (a3) has a function of adjusting the balance of hydrophilization/hydrophobization, and is useful for improving paint stability and anti-corrosion properties of a coating film obtained.

The amino group-containing epoxy resin (A) for use in the cationic electrodeposition paint composition of the present invention can be manufactured by subjecting the polycaprolactone polyol compound (a2) having an end hydroxyl group derived from caprolactone and the amino group-containing compound (a3) to an addition reaction with the modified epoxy resin (a1) by a known method.

The above-mentioned addition reaction can be performed, usually, in a suitable solvent at temperature of from about 90 to about 170° C., preferably from about 100 to about 150° C. for from 1 to 5 hours, preferably from 2 to 4 hours.

Examples of the above-mentioned organic solvents include hydrocarbon-based solvents such as toluene, xylene, cyclohexane and n-hexane; ester-based solvents such as methyl acetate, ethyl acetate and butyl acetate; ketone-based solvents such as acetone, methylethylketone, methylisobutylketone and methylamylketone; amide-based solvents such as dimethylformamide and dimethylacetamide; alcohol-based solvents such as methanol, ethanol, n-propanol and iso-propanol; and mixtures thereof.

The use ratio of respective reaction components in the above-mentioned addition reaction is not strictly limited but can be changed suitably according to applications of the cationic electrodeposition paint composition, which is appropriate when lying in the range below based on the total solid masses of three components of the modified epoxy resin (a1), the polycaprolactone polyol compound (a2) and the amino group-containing compound (a3).

The modified epoxy resin (a1): from 60 to 90% by mass, preferably from 62 to 85% by mass, furthermore preferably from 62 to 80% by mass, the polycaprolactone polyol compound (a2): from 5 to 30% by mass, preferably from 5 to 20% by mass, furthermore preferably from 5 to 18% by mass, the amino group-containing compound (a3): from 5 to 25% by mass, preferably from 6 to 19% by mass, furthermore preferably from 6 to 18% by mass. These ratios are useful for improving finish properties, chipping resistance and resistance to warm salt water immersion of the coating film obtained.

Blocked Polyisocyanate

The blocked polyisocyanate (B) used as a crosslinking agent in the paint composition of the present invention is obtained by blocking a polyisocyanate compound with an active hydrogen component containing propylene glycol.

For the blocked polyisocyanate (B), it is important to be stable at ordinary temperature and capable of dissociating the blocking agent when heated to baking temperature of the coating film, usually temperature in the range from about 100 to about 200° C. to regenerate a free isocyanate group.

In the present invention, the active hydrogen component denotes a component that has an active hydrogen reacting with an isocyanate group to block the isocyanate group, which widely includes those used as a blocking agent. In the present invention, the active hydrogen component used as a raw material of the blocked polyisocyanate (B) is characterized by containing propylene glycol.

Further, as the active hydrogen component, in addition to propylene glycol, another blocking agent can be used in combination if necessary. Examples of another blocking agent usable in combination include dipropylene glycol, 1,3-butanediol, 1,2-butanediol, 3-methyl-1,2-butanediol, 1,2-pentanediol, 1,4-pentanediol, 3-methyl-4,3-pentanediol, 3-methyl-4,5-pentanediol, 2,2,4-trimethyl-1,3-pentanediol, 1,5-hexanediol, 1,4-hexanediol etc., lactam compounds such as ε-caprolactam and γ-butyrolactam; oxime compounds such as methylethylketoxime and cyclohexanoneoxime; phenol compounds such as phenol, para-t-butylphenol and cresol; aliphatic alcohols such as n-butanol and 2-ethylhexanol; aromatic alkyl alcohols such as phenylcarbinol and methylphenylcarbinol; ether alcohol compounds such as ethylene glycol monopropyl ether, ethylene glycol monobutyl ether and diethylene glycol monoethyl ether; low molecular weight amide compounds such as n-methylacetamide, n-ethylacetamide, n-methylpropionamide and n-methylformamide; etc.

Among these, the use of propylene glycol as a blocking agent in a larger amount is suitable from the viewpoint of reactivity of blocked polyisocyanate, reduction of loss on heating, storage stability of a paint, etc. As to the blending ratio of propylene glycol and another diol component in a blocking agent, preferably propylene glycol is 20 mol percent or more, particularly in the range from 25 to 100 mol percent, relative to the total amount of both.

Examples of the above-mentioned polyisocyanate compounds to be blocked include aromatic, alicyclic or aliphatic polyisocyanate compounds such as tolylene diisocyanate, xylylene diisocyanate, phenylene diisocyanate, bis(isocyanatomethyl)cyclohexane, tetramethylene diisocyanate, hexamethylene diisocyanate, methylene diisocyanate, isophorone diisocyanate, phenylene diisocyanate, diphenylmethane-2,4'-diisocyanate, diphenylmethane-4,4'-diisocyanate and polymethylenepolyphenyl polyisocyanate; cyclized polymers and isocyanate biuret bodies of these polyisocyanate compounds; end isocyanate-containing compounds obtained by reacting a low molecular active hydrogen-containing compound such as ethylene glycol, trimethylolpropane, hexanetriol or castor oil to an excess amount of these isocyanate compounds; etc. These can be used in one kind, or in two or more kinds in mixture.

Among these, particularly, aromatic diisocyanate, among others, diphenylmethane-2,4'-diisocyanate, diphenylmethane-4,4'-diisocyanate (usually, called "MDI"), and crude MDI are suitable.

The crude MDI is a mixture of diphenylmethane-4,4'-diisocyanate, diphenylmethane-2,4'-diisocyanate and polymethylenepolyphenylpolyisocyanate as main components, and there are commercially available products such as Cosmonate M-50, Cosmonate M-200, Cosmonate M-100, Cosmonate M-300 etc. (all of which are manufactured by Mitsui Chemicals, Inc.); Sumidur 44V10, Sumidur 44V20, Sumidur 44V40 etc. (all of which are manufactured by Sumitomo Bayer Urethane Co., Ltd.); Lupranate M-12, Lupranate M-12S, Lupranate M-20, Lupranate M-20S etc. (all of which are manufactured by BASF, Germany); and Mondur MR (LIGHT) etc. (manufactured by Bayer AG).

As to the use ratio of a blocking agent and a polyisocyanate compound when manufacturing the blocked polyisocyanate (B), it is suitable that the equivalent ratio of active hydrogen in blocking agent/isocyanato group (NCO group) in polyisocyanate compound lies in the range from 1.3 to 2.3, particularly from 1.35 to 2.1, from the viewpoint of anticorrosion properties of an end face and the stability of the paint composition.

In the blocked polyisocyanate (B) to be obtained, usually, preferably the diol component (a) is bonded, on average, by 0.2 mol or more, particularly in the range from 0.25 to 1 mol, furthermore particularly from 0.25 to 0.95 mol relative to 1 mol of the polyisocyanate compound (b).

Here, the blocked polyisocyanate (B) fulfills the function of optimizing thermal flow properties in baking and the state of a precipitated coating film.

Cationic Electrodepositing Gelled Microparticulate Polymer

The cationic electrodeposition paint composition of the present invention contains the cationic electrodepositing gelled microparticulate polymer (C) formed by crosslinking an acrylic copolymer containing a hydrolyzable alkoxysilane group and a cationic group, in terms of solid content ratio, in from 0.1 to 20 parts by mass, preferably from 7 to 15 parts by mass, relative to the total 100 parts by mass of the amino group-containing epoxy resin (A) and the blocked polyisocyanate compound (B). Consequently, coated articles excellent in anticorrosion properties of an end face can be obtained. As the cationic electrodepositing gelled microparticulate polymer (C), those described in Japanese Patent Application Laid-Open Publication No. H02-269164 can be employed.

More specifically, the above-mentioned term "acrylic-based copolymer containing a hydrolyzable alkoxysilane group and a cationic group" is dispersed stably in water while utilizing a cationic group, particularly an amino group neutralized with an acid as a water-dispersible group, and a silanol group generated by the hydrolysis of the alcoxysilane group condenses with the silanol group each other and, when a hydroxyl group exists in the acrylic copolymer, with the hydroxyl group, too, to perform an intra-particle crosslinking, thereby gelating to form a gelled polymer microparticle capable of cationic electrodeposition. In the present invention, suitably the gelled polymer microparticle thus formed can be blended and used in the cationic electrodeposition paint composition.

Accordingly, the above-mentioned term "cationic electrodepositing gelled microparticulate polymer" includes a microparticulate polymer that is dispersed stably in water while utilizing a cationic group, particularly an amino group neutralized with an acid as a water-dispersible group and gelled by an intra-particle crosslinking, and that has an average particle diameter of 0.5 μm or less and is capable of cationic electrodeposition.

The acrylic-based copolymer containing a hydrolyzable alkoxysilane group and a cationic group, which is used for forming the above-mentioned gelled polymer microparticle can be manufactured, generally, by copolymerizing a monomer mixture that contains (a) a polymerizable unsaturated vinylsilane monomer containing a vinylic double bond and a hydrolyzable alkoxysilane group and (b) a polymerizable unsaturated monomer containing a vinylic double bond and a cationic group as indispensable monomer components, and, if necessary, (c) a polymerizable unsaturated monomer containing a vinylic double bond and a hydroxyl group and/or (d) a polymerizable unsaturated monomer other than the above.

The vinylsilane monomer of the above-mentioned (a) includes those represented by a general formula (i) or (ii) below:

[Chemical formula 4]

wherein $R^3$ represents an alkyl group or an alkoxyalkyl group having from 1 to 10 carbon atoms, $R^{3\prime}$ represents a hydrogen atom or a methyl group, m represents an integer of 0 or 1, and p represents an integer of from 1 to 8.

Examples of the vinylsilane monomers represented by the formula (i) include vinyltrimethoxysilane, vinyltriethoxysilane, vinyltris-β-methoxyethoxysilane etc. Examples of the vinylsilane monomers represented by the formula (ii) include γ-acryloxypropyltrimethoxysilane, γ-methacryloxypropyltrimethoxysilane, γ-methacryloxypropylmethyldimethoxysilane etc. and, among others, γ-methacryloxypropyltrimethoxysilane is suitable.

The (b) polymerizable unsaturated monomer containing a vinylic double bond and a cationic group is a monomer component that introduces a cationic group for giving a water-dispersible property to an acrylic-based copolymer to be generated. As the cationic group, a tertiary amino group, a quaternary ammonium salt group, a tertiary sulfonium salt group, a quaternary phosphonium salt group or the like can be utilized, and, among these, a tertiary amino group is particularly preferable.

Examples of the monomers containing a vinylic double bond and a tertiary amino group include dialkylaminoalkyl (meth)acrylates such as dimethylaminoethyl(meth)acrylate, dimethylaminopropyl(meth)acrylate and diethylaminoethyl (meth)acrylate (each of these alkyls is preferably an alkyl having from 1 to 6 carbon atoms); dialkylaminoalkyl(meth) acrylamides such as dimethylaminopropyl(meth)acrylamide and diethylaminoethyl(meth)acrylamide (each of these alkyls is preferably an alkyl having from 1 to 6 carbon atoms).

Examples of the polymerizable unsaturated monomers containing a quaternary ammonium salt group and a vinylic double bond include 3-acrylamide-3-methylbutyltrimethylammonium chloride, 3-methacrylamide-propyltrimethylammonium chloride, 2-methacryloyloxyethyltrimethylammonium chloride, etc.

The (c) polymerizable unsaturated monomer containing a vinylic double bond and a hydroxyl group is a monomer component that introduces, if necessary, a hydroxyl group into an acrylic copolymer, and the hydroxyl group works as a hydrophilic group when making an acrylic-based copolymer water-dispersible and/or as a functional group for the cross-linking reaction in a dispersed particle. Examples of the unsaturated monomers include hydroxyalkylesters of (meth) acrylic acid such as 2-hydroxyethyl(meth)acrylate and hydroxypropyl(meth)acrylate.

The (d) other polymerizable unsaturated monomer is an additional component constituting the acrylic-based copolymer, and known monomers for use in synthesis of ordinary acrylic resin can be used, including, for example, alkyl(C1 to C18) esters of (meth)acrylic acid such as methyl(meth)acrylate, ethyl(meth)acrylate, propyl(meth)acrylate, isopropyl(meth)acrylate, butyl(meth)acrylate, hexyl(meth)acrylate, octyl(meth)acrylate, lauryl(meth)acrylate and cyclohexyl acrylate; vinylaromatic monomers such as styrene, α-methylstyrene and vinyltoluene; amide derivatives of (meth) acrylic acid not containing a tertiary amino group; (meth) acrylonitrile; etc. These (d) monomers are selected suitably in accordance with properties required for an acrylic-based copolymer to be generated, and each of these may be used alone or two or more kinds may be used in combination.

The monomers (a) to (d) constituting the acrylic-based copolymer in the present invention are suitably used in the blending ratios, respectively, described below relative to the total weight of the monomers (a) to (d); (a) monomer: from 1 to 30% by weight, preferably from 3 to 20% by weight, furthermore preferably from 5 to 15% by weight; (b) monomer: from 5 to 30% by weight, preferably from 5 to 25% by weight, furthermore preferably 5 to 20% by weight; (c) monomer: from 0 to 30% by weight, preferably from 5 to 20% by weight, furthermore preferably from 5 to 15% by weight; (d) monomer: from 10 to 94% by weight, preferably from 35 to 82% by weight, furthermore preferably from 35 to 50% by weight.

As another method for manufacturing the acrylic-based copolymer containing a hydrolyzable alkoxysilane group and a cationic group, a method is mentioned, in which, in the copolymerization of the unsaturated monomers of (a) to (d) described above, instead of using the monomer of (b), a glycidyl group-containing unsaturated vinyl monomer (for example, glycidyl acrylate, glycidyl methacrylate, etc.) is used for performing the copolymerization to prepare once a glycidyl group-containing acrylic-based copolymer and, after that, a secondary amine or tertiary amine salt is reacted to the glycidyl group to introduce a tertiary amino group or a quaternary ammonium salt group, or a secondary sulfide salt or a tertiary phosphine salt is reacted to introduce a tertiary sulfonium salt group or a quaternary phosphonium salt group. Ordinary, the introduction of a tertiary amino group is preferable.

The copolymerization of the unsaturated monomers of (a) to (d) described above can be performed by a known method for manufacturing an acrylic-based copolymer, especially by a solution polymerization method. For example, it can be performed by continuing the reaction of the above-described monomer mixture in an appropriate solvent under the existence of a radical polymerization catalyst, usually, for from about 1 to about 20 hours at reaction temperature of from about 0 to about 180° C.

As the solvent to be used, so that no gelation is generated during the copolymerization reaction, the use of a solvent that is capable of dissolving a copolymerized body generated and is miscible with water is desirable.

As such solvents, for example, alcohol-based solvents, ether alcohol-based solvents, ether-based solvents, ketone-based solvents, ester-based solvents, etc. can be used.

As the polymerization catalyst, for example, azo-based compounds, peroxide-based compounds, sulfides, sulfines, diazo compounds, nitroso compounds, etc. can be used.

Further, in order to prevent unnecessary granulation of polymer generated due to the generation of a cross-linking reaction of alkoxysilane in the copolymerization, the polymerization reaction may be performed with the addition of a dehydrating agent such as dimethoxypropane for removing water that acts as a catalyst for the cross-linking reaction.

The acrylic-based copolymer thus obtained, generally, has desirably an amine value of from about 10 to about 100, preferably from about 15 to about 80, furthermore preferably from 20 to 75; a hydroxyl group value of from 0 to about 200, preferably from about 30 to about 130, furthermore preferably from 40 to 100; and a number average molecular weight of from about 5,000 to about 100,000, preferably from about 7,000 to about 30,000, furthermore preferably from 10,000 to 25,000.

When the amine value of the acrylic-based copolymer is smaller than 15, generally, dispersibility in water is insufficient and tends to form big particles. On the other hand, when the amine value is larger than 100, gelation tends to be generated in the solution polymerization. When the number average molecular weight of the acrylic-based copolymer is smaller than 5,000, frequently the water-dispersible property deteriorates or the degree of gelation lowers. On the other hand, when the number average molecular weight is larger than 100,000, viscosity of the polymer solution tends to rise and water dispersion tends to be difficult.

The water dispersion of the above-described acrylic-based copolymer can be performed according to a known method. For example, it can be performed by dispersing the acrylic-based copolymer manufactured as described above, which contains an alkoxysilane group and a cationic group and, furthermore, a hydroxyl group in some cases, by, when the cationic group is an amino group, neutralizing the amino group with an acid, for example, a water-soluble carboxylic acid etc. such as formic acid, acetic acid, lactic acid or hydroxylacetic acid of from about 0.1 to 1 equivalent relative to the amino group, and after that, by dispersing the same so as to give a solid content concentration of about 40% by mass or less in water.

Dispersed particles of the water dispersion of the acrylic-based copolymer thus obtained are subjected to intra-particulate crosslinking. The intra-particle crosslinking is possible to some degree by simply storing the dispersion for a long period of time, but, profitably it is desirable to accelerate the intra-particle crosslinking by heating the water-dispersed material to temperature of 50° C. or higher. Alternatively, it is also possible to perform the intra-particle crosslinking at the same time as performing the water dispersion by adding a silanol group-condensed catalyst such as tin octylate, zinc octylate, zirconium octylate or dibutyl tin laurate in a copolymer solution or an aqueous medium when water-dispersing the acrylic-based copolymer and performing the water dispersion under the existence of the catalyst.

The gelled microparticulate polymer water-dispersed liquid thus manufactured can have a resin solid content of usually from about 10 to 40% by mass, preferably from 15 to 30% by mass. The particle diameter of the dispersed particle is generally 0.5 µm or less, preferably in the range from 0.01 to 0.3 µm, more preferably from 0.05 to 0.2 µm. The adjustment of the particle diameter can be performed by adjusting the amount of the cationic group in the acrylic-based copolymer, and the diameter in the intended range can be obtained easily.

Cationic Electrodeposition Paint Composition

As to the blending ratio of amino group-containing epoxy resin (A) and the blocked polyisocyanate-curing agent (B) in the cationic electrodeposition paint composition of the present invention, on the basis of the total solid content mass of the components, the amino group-containing epoxy resin (A) and the blocked polyisocyanate curing agent (B), the amino group-containing epoxy resin (A) is in the range from 50 to 95% by mass, preferably from 60 to 90% by mass, and the blocked polyisocyanate curing agent (B) is in the range from 5 to 50% by mass, preferably from 10 to 40% by mass. If the ratio lies outside this range, any of coating properties, chipping resistance and resistance to warm salt water immersion may be deteriorated.

Meanwhile, the manufacturing of a cationic electrodeposition paint containing the amino group-containing epoxy resin (A) as a resin component can be performed, for example, as below. The amino group-containing epoxy resin (A) and the blocked polyisocyanate curing agent (B) and, in addition, various additives such as a surfactant and surface-adjusting agent, an organic solvent etc. are mixed sufficiently to form a blended resin, and, after that, the blended resin is neutralized with an organic carboxylic acid or the like to be made water-soluble or water-dispersible to give emulsion. Meanwhile, for the neutralization of the blended resin, generally, a known organic carboxylic acid can be used, and, among these, acetic acid, formic acid, lactic acid or a mixture thereof is suitable. By, subsequently, adding a pigment-dispersed paste to the emulsion and adjusting the same with water, the cationic electrodeposition paint can be prepared.

The above-mentioned pigment-dispersed paste is a paste of a colored pigment, a rust preventive pigment, a body pigment etc. previously dispersed in microscopic particles. For example, a pigment-dispersed paste can be prepared by blending a resin for dispersing a pigment, a neutralizing agent and pigments and subjecting the blend to a dispersion treatment in a dispersive blending machine such as a ball mill, a sand mill or a pebble mill.

As the resin for dispersing a pigment, those known can be used, and usable examples thereof include resins having a hydroxyl group and a cationic group, surfactants, tertiary amine-type epoxy resins, quaternary ammonium salt-type epoxy resins, tertiary sulfonium salt-type epoxy resins etc. As to the use amount of the above-mentioned pigment-dispersing agent, an amount in the range from 1 to 150 parts by mass per 100 parts by mass of pigments, particularly from 10 to 100 parts by mass is suitable.

The above-mentioned pigments can be used without particular limitation, and, for example, colored pigments such as titanium oxide, carbon black and colcothar; body pigments such as clay, mica, baryta, calcium carbonate and silica; and rust preventive pigments such as aluminum phosphomolybdic acid, aluminum tripolyphosphate and zinc oxide (zinc white) can be added.

Furthermore, for the purpose of suppressing corrosion or preventing rust, a bismuth compound can be incorporated. As the above-mentioned bismuth compound, for example, bismuth oxide, bismuth hydroxide, basic bismuth carbonate, bismuth nitrate, bismuth silicate, bismuth salts of organic acids, etc. can be employed.

For the purpose of improving curing properties of the coating film, organic tin compounds such as dibutyltin dibenzoate, dioctyltin oxide and dibutyltin oxide can be employed. The blending amount of these pigments is preferably in the range from 1 to 100 parts by mass, particularly from 10 to 50 parts by mass relative to 100 parts by mass of the total solid content of the amino group-containing epoxy resin (A) and the blocked polyisocyanate curing agent (B).

Meanwhile, examples of organic solvents usable for the cationic electrodeposition paint composition of the present invention include alcohol-based solvents such as methyl alcohol, ethyl alcohol, n-butyl alcohol, isopropyl alcohol, 2-ethylhexanol, benzyl alcohol, ethylene glycol and propylene glycol; ether-based solvents such as ethylene glycol monoethyl ether, ethylene glycol monobutyl ether, ethylene glycol monohexyl ether, ethylene glycol mono-2-ethylhexyl ether, diethylene glycol monobutyl ether, propylene glycol monomethyl ether, propylene glycol monophenyl ether, 3-methyl-3-methoxybutanol, diethylene glycol monoethyl ether and diethylene glycol monobutyl ether; ketone-based solvents such as acetone, methylisobutylketone, cyclohexanone, isophorone and acetylacetone; ester-based solvents such as ethylene glycol monoethyl ether acetate and ethylene glycol monobutyl ether acetate; and mixtures thereof. In the present invention, the blending amount of the above-mentioned organic solvent in the cationic electrodeposition paint composition bath is preferably from 1.4 to 2.3% by mass.

About Method for Forming a Coating Film

The present invention provides a method for forming a cationic electrodeposition coating film, including a step of immersing an object to be coated in an electrodeposition bath including the cationic electrodeposition paint composition of the present invention, and a step of supplying electric power using the object to be coated as a cathode.

In the method for forming a coating film using the cationic electrodeposition paint composition of the present invention, as the object to be coated, automobile bodies, parts of two-wheel vehicles, household devices and other devices are mentioned, and there is no particular limitation on the use if it is metal. Examples of metal sheets as the objects to be coated include a cold-rolled steel sheet, an alloyed hot dip zincing steel sheet, an electrolytic zinc-coated steel sheet, an electrolytic zinc-iron double layer-coated steel sheet, an organic composite plated steel sheet, an Al sheet, a Mg sheet etc., and those obtained by subjecting these metal sheets to, if necessary, surface washing such as alkaline degreasing and, after that, to a surface treatment such as a phosphating process or a chromating process.

The cationic electrodeposition paint composition can be coated by electrodeposition coating on the surface of an intended base material. The cationic electrodeposition coating can be performed, generally, by adjusting an electrodeposition bath including the electrodeposition paint composition to bath temperature of, usually, from 15 to 35° C., and by supplying electric power using an object to be coated as a cathode under a condition of a load voltage of from 100 to 400 V, wherein the electrodeposition paint composition had been diluted with deionized water to adjust the solid content concentration to about from 5 to 40% by mass and, furthermore, the pH thereof had been adjusted in the range from 5.5 to 9.0, After the electrodeposition coating, usually, in order to eliminate the cationic electrodeposition paint adhering excessively to the object to be coated, sufficient water washing is performed by an ultrafiltrate (UF filtrate), reverse osmosis-treated water (RO water), industrial water, pure water, etc.

The thickness of the electrodeposition coating film is not particularly limited, but, it can be set, generally, to be in the range from 5 to 40 preferably from 12 to 30 on the basis of a dry coating film. Baking drying of the coating film is performed by heating, while using drying facilities such as an electric hot air dryer or a gas hot air dryer, the electrodeposition coating film at the surface temperature of a coated object at from 110° C. to 200° C., preferably from 140 to 180° C. for from 10 minutes to 180 minutes, preferably from 20 minutes to 50 minutes. By the above-mentioned baking drying, the coating film can be cured.

Further, in the case where the cationic electrodeposition paint composition of the present invention is filled in an electrodeposition tank to be used as a bath, dry film thickness when electrodeposition coating is performed under conditions of an applied voltage of 200 V, bath temperature of 28° C. for 3 minutes is denoted by M1 (μm), and dry film thickness when electrodeposition coating is performed under conditions of an applied voltage of 200 V, bath temperature of 40° C. for 3 minutes is denoted by M2 (μm), when the difference in film thickness (Δμm) between the dry film thickness M2 and the dry film thickness M1 is 15 μm or less, preferably 12 μm or less, clearance coating properties are good.

EXAMPLES

Hereinafter, based on Examples, the present invention will be described in more detail. Meanwhile, terms "part" and "%" represent "part by mass" and "% by mass," unless otherwise specified.

Manufacturing of Amino Group-Containing Modified Epoxy Resin (A)

Manufacturing Example 1

Manufacturing Example of Base Resin No. 1

To a flask, 1000 parts of jER828EL (Note 1), 400 parts of bisphenol A and 0.2 parts of dimethylbenzylamine were added and reacted until giving an epoxy equivalent of 750 at 130° C.

Next, 100 parts of ε-caprolactone and 0.05 parts of tetrabutoxytitanium were added and the temperature was raised to 170° C., to be reacted at 170° C. for 4 hours.

Next, to the reacted result, 100 parts of Placcel 205 (Note 2), 140 parts of diethanolamine and 65 parts of a ketiminized compound of diethylenetriamine with methylisobutylketone (purity 84%) were added and reacted at 120° C. for 4 hours, and, after that, 400 parts of ethylene glycol monobutyl ether was added to give a base resin No. 1 having an amine value of 56 and a resin solid content of 80%.

(Note 1) jER828EL: trade name, manufactured by Japan Epoxy Resin Co., Ltd., epoxy resin having an epoxy equivalent of 190 and a number average molecular weight of 350

(Note 2) Placcel 205: trade name, manufactured by Daicel Chemical Industries, Ltd., polycaprolactone polyol compound (corresponding to the compound represented by the formula (2), number average molecular weight of 530).

Manufacturing Example 2

Manufacturing Example of Base Resin No. 2

To a flask, 1000 parts of jER828EL (Note 1), 400 parts of bisphenol A and 0.2 parts of dimethylbenzylamine were added and reacted until giving an epoxy equivalent of 750 at 130° C.

Next, 100 parts of ε-caprolactone and 0.05 parts of tetrabutoxytitanium were added and the temperature was raised to 170° C., to be reacted at 170° C. for 4 hours.

Next, to the reacted result, 100 parts of Placcel 305 (Note 3), 140 parts of diethanolamine and 65 parts of a ketiminized compound of diethylenetriamine (purity 84%) were added, to be reacted at 120° C. for 4 hours. After that, 400 parts of ethylene glycol monobutyl ether was added to give a base resin No. 2 having an amine value of 56 and a resin solid content of 80%.

(Note 3) Placcel 305: trade name, manufactured by Daicel Chemical Industries, Ltd., polycaprolactone polyol compound (corresponding to the compound represented by the formula (3), number average molecular weight of 550).

Manufacturing Example 3

Manufacturing Example of Base Resin No. 3 (Comparative Example)

To 1010 parts of jER828EL (Note 1), 390 parts of bisphenol A and 0.2 parts of dimethylbenzylamine were added, to be reacted until giving an epoxy equivalent of 800 at 130° C.

Next, 160 g of diethanolamine and 65 parts of a ketiminized compound of diethylenetriamine were added, to be reacted at 120° C. for 4 hours. After that, 355 parts of ethylene glycol monobutyl ether was added to give a base resin No. 3 having an amine value of 67 and a solid content of 80%.

Manufacturing Example 4

Manufacturing Example of Base Resin No. 4 (Comparative Example)

To a flask, 1000 parts of jER828EL (Note 1), 400 parts of bisphenol A and 0.2 parts of dimethylbenzylamine were added, to be reacted until giving an epoxy equivalent of 750 at 130° C.

Next, 333 parts of Placcel 205 (Note 2), 126 parts of diethanolamine and 65 parts of a ketiminized compound of diethylenetriamine were added, to be reacted at 120° C. for 4 hours. After that, 425 g of ethylene glycol monobutyl ether was added to give a base resin No. 4 having an amine value of 48 and a resin solid content of 80%.

Manufacturing of Blocked Polyisocyanate Curing Agent (B)

Manufacturing Example 5

Manufacturing of Curing Agent No. 1 Solution

Into a reaction vessel, 152 parts of propylene glycol and 108 parts of methylisobutylketone were added, and the temperature was raised to 70° C. Into it, 275 parts of "Cosmonate M-200" (trade name, manufactured by Mitsui Chemicals, Inc., crude MDI) was added gradually, and, after that, the temperature was raised to 90° C. While maintaining the temperature, sampling was performed with lapse of time and that an isocyanate value became 1 or less was confirmed to give a curing agent No. 1 solution having a solid content of 80%.

Manufacturing Example 6

Manufacturing of Curing Agent No. 2 Solution

Into a reaction vessel, 114 parts of propylene glycol, 70 parts of diethylene glycol monoethyl ether and 115 parts of methylisobutylketone were added and the temperature was raised to 70° C.

Into it, 275 parts of "Cosmonate M-200" was added gradually, and, after that, the temperature was raised to 90° C. While maintaining the temperature, sampling was performed with lapse of time, and that the absorption of an unreacted isocyanato group had disappeared was confirmed by infrared absorption spectrum measurement to give a curing agent No. 2 solution having a solid content of 80%.

Manufacturing Example 7

Manufacturing of Curing Agent No. 3 Solution

Into a reaction vessel, 114 parts of propylene glycol, 70 parts of diethylene glycol monoethyl ether and 110 parts of methylisobutylketone were added, and the temperature was raised to 70° C. Into it, 250 parts of MDI (diphenylmethane-4,4'-diisocyanate) was added gradually, and, after that, the temperature was raised to 90° C. While maintaining the temperature, sampling was performed with lapse of time, and that an isocyanate value became 1 or less was confirmed to give a curing agent No. 3 solution having a solid content of 80%.

Manufacturing Example 8

Manufacturing of Curing Agent No. 4 Solution (Comparative Example)

Into a reaction vessel, 222 parts of isophorone diisocyanate and 99 parts of methylisobutylketone were added, and the temperature was raised to 50° C. Into it, 174 parts of methylethylketoxime was added gradually, and the temperature was raised to 60° C. While maintaining the temperature, sampling was performed with lapse of time, and that an isocyanate value became 1 or less was confirmed to give a curing agent No. 4 solution having a solid content of 80%.

Manufacturing Example 9

Manufacturing of Curing Agent No. 5 Solution (Comparative Example)

Into a reaction vessel, 275 parts of "Cosmonate M-200" and 136 parts of methylisobutylketone were added, and the temperature was raised to 70° C. After adding gradually 268 parts of diethylene glycol monoethyl ether, the temperature was raised to 90° C. While maintaining the temperature, sampling was performed with lapse of time, and that an isocyanate value became 1 or less was confirmed to give a curing agent No. 5 solution having a solid content of 80%.

Manufacturing of Emulsion

Manufacturing Example 10

Manufacturing Example of Emulsion No. 1

75 parts of the base resin No. 1 obtained in Manufacturing example 1 (solid content of 70 parts) and 37.5 parts of curing agent No. 5 obtained in Manufacturing example 5 (solid content of 30 parts) were mixed, and furthermore 13 parts of 10% acetic acid were blended and stirred uniformly. After that, 156 parts of deionized water was dropped with strong stirring over about 15 minutes to give an emulsion No. 1 having a solid content of 34%.

Manufacturing Examples 11 to 16

Manufacturing Examples of Emulsions No. 2 to No. 7

The process in Manufacturing example 10 was repeated, except for changing the blending content to those shown in Table 1 to give emulsions No. 2 to No. 7.

TABLE 1

|  |  | Manufacturing example 10 | Manufacturing example 11 | Manufacturing example 12 | Manufacturing example 13 | Manufacturing example 14 | Manufacturing example 15 | Manufacturing example 16 |
|---|---|---|---|---|---|---|---|---|
|  | Emulsion | No. 1 | No. 2 | No. 3 | No. 4 | No. 5 | No. 6 | No. 7 |
| Blending contents | Base resin No. 1 | 87.5 (70) | 87.5 (70) | 87.5 (70) |  | 87.5 (70) |  |  |
|  | Base resin No. 2 |  |  |  | 87.5 (70) |  |  |  |
|  | Base resin No. 3 |  |  |  |  |  | 87.5 (70) |  |
|  | Base resin No. 4 |  |  |  |  |  |  | 87.5 (70) |
|  | Curing agent No. 1 | 33.3 (30) |  |  | 33.3 (30) |  |  |  |
|  | Curing agent No. 2 |  | 33.3 (30) |  |  |  |  |  |
|  | Curing agent No. 3 |  |  | 33.3 (30) |  |  |  |  |
|  | Curing agent No. 4 |  |  |  |  | 33.3 (30) | 33.3 (30) |  |
|  | Curing agent No. 5 |  |  |  |  |  |  | 33.3 (30) |
|  | 10% Acetic acid | 13 | 13 | 13 | 13 | 13 | 13 | 13 |
|  | Deionized water | 160.2 | 160.2 | 160.2 | 160.2 | 160.2 | 160.2 | 160.2 |
|  | Emulsion | 294 (100) | 294 (100) | 294 (100) | 294 (100) | 294 (100) | 294 (100) | 294 (100) |

Numerals in blending show a solid content.

Manufacturing Example 17

Manufacturing Example of Resin for Dispersing Pigment

To 1010 parts of jER828EL (Note 1), 390 parts of bisphenol A, 240 parts of Placcel 212 (trade name, by Daicel Chemical Industries, Ltd., polycaprolactone diol having weight average molecular weight of about 1,250) and 0.2 parts of dimethylbenzylamine were added, to be reacted until the epoxy equivalent became about 1,090 at 130° C.

Next, 134 parts of dimethylethanolamine and 150 parts of a 90% lactic acid aqueous solution were added, to be reacted at 120° C. for 4 hours. Subsequently, methylisobutylketone was added to adjust the solid content to give an ammonium salt-type resin-based resin for dispersing pigment having a solid content of 60%. Ammonium salt concentration of the resin for dispersion was 0.78 mmol/g.

Manufacturing Example 18

Manufacturing Example of Pigment-Dispersed Paste 8.3 parts of the resin for dispersing pigment having a solid content of 60% obtained in Manufacturing example 17 (solid content 5 parts), 14.5 parts of titanium oxide, 7.0 parts of purified clay, 0.3 parts of carbon black, 1 part of dioctyltin oxide, 1 part of bismuth hydroxide and 20.3 parts of deionized water were added, to be dispersed with a ball mill for 20 hours to give a pigment-dispersed paste having a solid content of 55%.

Manufacturing of Cationic Electrodepositing Gelled Microparticulate Polymer (C)

Manufacturing Example 19

Manufacturing Example of Cationic Electrodepositing Gelled Microparticulate Polymer Into a 1 flask equipped with a stirring apparatus, a thermometer, a cooling tube and a heating mantle, 320 parts of isopropyl alcohol was charged, and the temperature was raised with stirring to a reflux temperature (about 83° C.). Into it, a mixture of monomers and a polymerization initiator below was dropped at the reflux temperature (about 83 to 87° C.) over about 2 hours: 272 parts of styrene, 224 parts of n-butyl acrylate, 80 parts of 2-hydroxyethyl acrylate, 144 parts of dimethylaminoethyl methacrylate, 80 parts of KMB-503 (Note 4) and 24 parts of azobisisobutyronitrile. Subsequently, after stirring for additional 30 minutes, a solution of 8 parts of azobisdimethylvaleronitrile dissolved in 120 parts of isopropyl alcohol was dropped over about 1 hour, and, after stirring of about 1 hour, 320 parts of isopropyl alcohol was thrown and cooled. Thus, an acrylic copolymer varnish having a solid content of 51%, an amine value of 64, a hydroxyl group value of 48, and number average molecular weight of about 20,000 was obtained.

Next, to 780 parts of the acrylic copolymer varnish, 6.4 parts of acetic acid was added and stirred at about 30° C. for 5 minutes, and, after that, 1156 parts of deionized water was dropped over about 30 minutes with strong stirring, the temperature was raised to 75 to 80° C. and stirring was performed for about 3 hours. Thus, an intra-particle cross-linked cationic electrodepositing gelled microparticulate polymer of milk white having a solid content of 20% was obtained.

(Note 4) KMB-503: γ-methacryloxypropyltrimethoxysilane (manufactured by Shin-Etsu Chemical Co., Ltd.)

Manufacturing of Cationic Electrodeposition Paint

Example 1

294 parts of the emulsion No. 1 (solid content of 100 parts) obtained in Manufacturing example 10, 52.4 parts of the pigment-dispersed paste of 55% (solid content of 28.8 parts)

obtained in Manufacturing example 20, and further 37.5 parts of the cationic electrodepositing gelled microparticulate polymer (a solid content of 7.5 parts) were added, and 260.1 parts of deionized water was added to adjust the amount of the organic solvent and the solid content, to give cationic electrodeposition paint No. 1 having a solid content of 20%. The amount of organic solvents in the bath (Note 5) in the cationic electrodeposition paint No. 1 was 1.7% by mass.

(Note 5) Amount of organic solvents in the bath: each of cationic electrodeposition paints was collected by 10 μl with a microsyringe, which was injected into GC-15A (trade name, manufactured by Shimadzu Corporation, gas chromatography), and measured under conditions below: column was WAX-10 (manufactured by SUPELCO), column temperature was raised up to 200° C. at a rising rate of 5° C./min, carrier gas was He.

Examples 2 to 8

Cationic electrodeposition paints No. 2 to No. 8 were manufactured in the same way as that in Example 1, with blending contents as shown in Table 2.

TABLE 2

|  |  | Example 1 | Example 2 | Example 3 | Example 4 | Example 5 | Example 6 | Example 7 | Example 8 |
|---|---|---|---|---|---|---|---|---|---|
| Cationic electrodeposition paint |  | No. 1 | No. 2 | No. 3 | No. 4 | No. 5 | No. 6 | No. 7 | No. 8 |
| Blending contents | Emulsion No. 1 | 294 | 294 | 294 | 294 | 294 |  |  |  |
|  |  | (100) | (100) | (100) | (100) | (100) |  |  |  |
|  | Emulsion No. 2 |  |  |  |  |  | 294 |  |  |
|  |  |  |  |  |  |  | (100) |  |  |
|  | Emulsion No. 3 |  |  |  |  |  |  | 294 |  |
|  |  |  |  |  |  |  |  | (100) |  |
|  | Emulsion No. 4 |  |  |  |  |  |  |  | 294 |
|  |  |  |  |  |  |  |  |  | (100) |
|  | Pigment-dispersed paste | 52.4 | 52.4 | 52.4 | 52.4 | 52.4 | 52.4 | 52.4 | 52.4 |
|  |  | (28.8) | (28.8) | (28.8) | (28.8) | (28.8) | (28.8) | (28.8) | (28.8) |
|  | Cationic electrodepositing gelled microparticulate polymer (solid content 20%) | 37.5 | 25 | 50 | 37.5 | 37.5 | 37.5 | 37.5 | 37.5 |
|  |  | (7.5) | (5) | (10) | (7.5) | (7.5) | (7.5) | (7.5) | (7.5) |
|  | Deionized water | 260.1 | 272.6 | 247.6 | 260.1 | 260.1 | 260.1 | 260.1 | 260.1 |
| Cationic electrodeposition paint solid content 20% |  | 644 | 644 | 644 | 644 | 644 | 644 | 644 | 644 |
|  |  | (128.8) | (128.8) | (128.8) | (128.8) | (128.8) | (128.8) | (128.8) | (128.8) |
| (Note 5) Amount of organic solvents in bath (%) |  | 1.7 | 1.7 | 1.7 | 1.3 | 2.5 | 1.7 | 1.7 | 1.7 |

Numerals show a blending amount, and ( ) shows a solid content.

Comparative Examples 1 to 7

Cationic electrodeposition paints No. 9 to No. 15 were manufactured in the same way as that in Example 1, with blending contents as shown in Table 3.

TABLE 3

|  |  | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|
| Cationic electrodeposition paint | | No. 9 | No. 10 | No. 11 | No. 12 | No. 13 | No. 14 | No. 15 |
| Blending contents | Emulsion No. 1 | | 294 (100) | 294 (100) | | | | |
| | Emulsion No. 3 | | | | | | 294 (100) | 294 (100) |
| | Emulsion No. 5 | 294 (100) | | | | | | |
| | Emulsion No. 6 | | | | 294 (100) | | | |
| | Emulsion No. 7 | | | | | 294 (100) | | |
| | Pigment-dispersed paste | 52.4 (28.8) | 52.4 (28.8) | 52.4 (28.8) | 52.4 (28.8) | 52.4 (28.8) | 52.4 (28.8) | 53.4 (28.9) |
| | Cationic electrodepositing gelled microparticulate polymer (solid content 20%) | 37.5 (7.5) | | 150 (30) | | 25 (5) | | 150 (30) |
| | Deionized water | 260.1 | 297.6 | 147.6 | 297.6 | 272.6 | 297.6 | 146.6 |
| | Cationic electrodeposition paint solid content 20% | 644 (128.8) | 644 (128.8) | 644 (128.8) | 644 (128.8) | 644 (128.8) | 644 (128.8) | 644 (128.8) |
| | (Note 5) Amount of organic solvents in bath (%) | 1.7 | 1.7 | 1.7 | 1.9 | 1.9 | 1.7 | 1.7 |

Numerals show a blending amount, and ( ) shows a solid content.

Fabrication of Test Sheet

Using as a test sheet, cold-rolled steel sheets (0.8 mm×150 mm×70 mm) having been subjected to passivation with Parbond #3065 (trade name, manufactured by Nihon Parkerizing Co., Ltd., zinc phosphate passivating agent), electrodeposition coating of each of cationic electrodeposition paints was performed according to test contents below. Test results are shown in Table 4 and Table 5.

TABLE 4

| Factor | Component Name | | Component Name | Unit | Example 1 No. 1 | Example 2 No. 2 | Example 3 No. 3 | Example 4 No. 4 | Example 5 No. 5 | Example 6 No. 6 | Example 7 No. 7 | Example 8 No. 8 |
|---|---|---|---|---|---|---|---|---|---|---|---|---|
| | | | | | | | | Cationic electrodeposition paint | | | | |
| | (A) | (a1) Modified epoxy resin | Hydroxyl group-containing epoxy resin | Part by mass | 1400 | 1400 | 1400 | 1400 | 1400 | 1400 | 1400 | 1400 |
| | | (a12) | Caprolactone | Part by mass | 100 | 100 | 100 | 100 | 100 | 100 | 100 | 100 |
| | | Polycaprolactonepolyol compound | | Part by mass | 100 | 100 | 100 | 100 | 100 | 100 | 100 | 100 |
| | | | | | Placcel 205 | Placcel 205 | Placcel 205 | Placcel 205 | Placcel 205 | Placcel 205 | Placcel 205 | Placcel 305 |
| | | (a3) Amino group-containing compound | Amine-added epoxy resin | Part by mass | 205 | 205 | 205 | 205 | 205 | 205 | 205 | 205 |
| | (B) | Blocked polyisocyanate | Polyisocyanate compound | Part by mass | 70 | 70 | 70 | 70 | 70 | 70 | 70 | 70 |
| | | | | Part by mass | 30 | 30 | 30 | 30 | 30 | 30 | 30 | 30 |
| | | | | | Crude MDI | Crude MDI | Crude MDI | Crude MDI | Crude MDI | Crude MDI | MDI | Crude MDI |
| | | Blocking agent | | | Propylene glycol | Propylene glycol | Propylene glycol | Propylene glycol | Propylene glycol | Propylene glycol Diethylene glycol monobutyl ether | Propylene glycol Diethylene glycol monobutyl ether | Propylene glycol |
| | (C) | Cationic electrodepositing gelled microparticulate polymer | | Part by mass of C to total 100 parts by mass of A and B | 7.5 | 5 | 10 | 7.5 | 7.5 | 7.5 | 7.5 | 7.5 |
| | Organic solvent | Ethylene glycol monobutyl ether etc. | | % by mass | 1.7 | 1.7 | 1.7 | 1.3 | 2.5 | 1.7 | 1.7 | 1.7 |
| Paint properties | Bath temperature (° C.) - film thickness (μm) (Note 6) | | | 28° C. | 14 | 14 | 14 | 14 | 15 | 14 | 14 | 14 |
| | | | | 40° C. | 27 | 28 | 28 | 25 | 30 | 27 | 27 | 27 |
| | | | | Δμm | 13 | 14 | 14 | 11 | 15 | 13 | 13 | 13 |
| Test result | Clearance coating properties | | | (Note 7) | S | S | S | A | A | S | S | S |
| | Edge anticorrosion properties | | | (Note 8) | S | A | S | A | S | S | S | S |
| | Finishing properties | | | (Note 9) | S | S | A | A | A | S | S | S |
| | Comprehensive evaluation | | | (Note 10) | S | A | A | A | A | S | S | S |

TABLE 5

| Factor | Component Name | | Component Name | Unit | Comparative Example 1 No. 9 | Comparative Example 2 No. 10 | Comparative Example 3 No. 11 | Comparative Example 4 No. 12 | Comparative Example 5 No. 13 | Comparative Example 6 No. 14 | Comparative Example 7 No. 15 |
|---|---|---|---|---|---|---|---|---|---|---|---|
| | | | | | | | Cationic electrodeposition paint | | | | |
| (A) | (a1) Modified epoxy resin | | Hydroxyl group-containing epoxy resin | Part by mass | 1400 | 1400 | 1400 | 1400 | 1400 | 1400 | 1400 |
| | (a2) Polycaprolactonepolyol compound | | Caprolactone | Part by mass | 100 | 100 | 100 | | | 100 | 100 |
| | | | | Part by mass | 100 | 100 | 100 | | | 100 | 100 |
| | | | Kind | | Placcel 205 | Placcel 205 | Placcel 205 | | 333 | Placcel 205 | Placcel 205 |
| | | | | Part by mass | 205 | 205 | 205 | | 191 | 205 | 205 |
| | (a3) Amino group-containing compound | | Amine-added epoxy resin | Part by mass | 70 | 70 | 70 | 70 | 70 | 70 | 70 |
| (B) | Blocked polyisocyanate | | Polyisocyanate compound | Part by mass | 30 | 30 | 30 | 30 | 30 | 30 | 30 |
| | | | | | Isophorone diisocyanate | Crude MDI | Crude MDI | Isophorone diisocyanate | Crude MDI | MDI | MDI |
| | Blocking agent | | | | Methylethyl ketoxime | Propylene glycol | Propylene glycol | Methylethylketoxime | Diethylene glycol monobutyl ether | Propylene glycol Diethylene glycol monobutyl ether | Propylene glycol Diethylene glycol monobutyl ether |
| (C) | Cationic electrodepositing gelled microparticulate polymer | | | Part by mass of C to total 100 parts by mass of A and B | 7.5 | — | 30 | — | 5 | — | 30 |
| Organic solvent | Ethylene glycol monobutyl ether etc. | | | % by mass | 1.7 | 1.7 | 1.7 | 1.9 | 1.9 | 1.7 | 1.7 |
| Paint properties | Bath temperature (° C.) - film thickness (μm) (Note 6) | | 28° C. | | 14 | 14 | 14 | 14 | 14 | 14 | 14 |
| | | | 40° C. | | 34 | 26 | 34 | 42 | 42 | 26 | 34 |
| | | | | Aμm | 20 | 12 | 20 | 28 | 28 | 12 | 20 |
| Test result | Clearance coating properties | | | (Note 7) | C | S | C | C | C | S | C |
| | Edge anticorrosion properties | | | (Note 8) | A | C | S | C | A | C | S |
| | Finishing properties | | | (Note 9) | A | S | C | S | S | S | C |
| | Comprehensive evaluation | | | (Note 10) | C | C | C | C | C | C | C |

(Note 6) Bath temperature (° C.)–film thickness (μm): for the above-mentioned cold-rolled steel sheets, electrodeposition coating was performed using each of cationic electrodeposition paints at 200 V and bath temperature of 28° C. for 3 minutes. In the same way, for the above-mentioned cold-rolled steel sheets, electrodeposition coating was performed using each of cationic electrodeposition paints at 200 V and bath temperature of 40° C. for 3 minutes. Dry thicknesses of respective sheets were measured, and respective thickness differences (μμm) were obtained.

(Note 7) clearance coating properties: the "double-laminated test sheet" as shown in FIG. 2 was used, and a spacer having 100 μm was inserted between two steel sheets. Electrodeposition coating was performed under such conditions: cathode/anode=½, anode-cathode distance of 15 cm, applied voltage of 200 V, bath temperature of 28° C. and power supply for 3 minutes. After the electrodeposition coating, a clip was removed and a throwing property inside the test sheet was obtained by measuring a range of deposit from the opening of the test sheet:

S: uncoated part does not exist inside the gap
A: from 10 mm or more to less than 12 mm from the opening of the test sheet
B: in the range from more than 5 mm to less than 10 mm from the opening of the test sheet
C: less than 5 mm from the opening of the test sheet.

(Note 8) Edge anticorrosion properties: for a cutter blade (blade angle of 20 degrees, length of 10 cm, treated with zinc phosphate), electrodeposition coating was performed at bath temperature of 28° C. while adjusting power supply time so as to fabricate a test sheet having a 15 μm-thick film on a general surface. Next, for the sheet, a salt spray resistance test was performed for 168 hours according to JISZ-2371, and the edge part was evaluated based on the standard below:

S: number of rusts generated was less than 30/10 cm
A: number of rusts generated was from 31 to 49/10 cm
C: number of rusts generated was 50/10 cm or more.

(Note 9) finish properties: each of cold-rolled steel sheets of 0.8×150×70 mm having been subjected to a passivation treatment with Parbond #3065 (trade name, manufactured by Nihon Parkerizing Co., Ltd., zinc phosphate passivating agent) was immersed in respective cationic electrodeposition paints to be subjected to electrodeposition coating at bath temperature of 28° C. while adjusting power supply time so as to give a dry film thickness of 20 and the obtained coating film was baked with a hot air dryer at 170° C. for 20 minutes. The surface roughness of the electrodeposition coating film was measured with Surftest 301 (trade name, manufactured by Mitutoyo Corporation, surface roughness measuring instrument) to give a Ra value:

S: Ra value is less than 0.22
A: Ra value is 0.22 or more and less than 0.25
B: Ra value is 0.25 or more and less than 0.35
C: Ra value is 0.35 or more.

(Note 10) comprehensive evaluation: in the field of the cationic electrodeposition paint to which the present invention belongs, it is desirable that all of the clearance coating properties, the finishing properties and the edge anticorrosion properties are excellent. Accordingly, a comprehensive evaluation was performed based on the standard below:

S: film thickness difference (Δμm) in bath temperature (° C.)–film thickness (μμm) is 15 μm or less, and all of the clearance coating properties, the edge anticorrosion properties and the finish properties belong to S
A: film thickness difference (Δμm) in bath temperature (° C.)–film thickness (μm) is 15 μm or less, and all of the clearance coating properties, the edge anticorrosion properties and the finish properties belong to S or A, but at least one belongs to A
B: film thickness difference (Δμm) in bath temperature (° C.)–film thickness (μm) is 15 μm or less, and all of the clearance coating properties, the edge anticorrosion properties and the finish properties belong to S, A or B, but at least one belongs to B
C: film thickness difference (Δμm) in bath temperature (° C.)–film thickness (μm) is more than 15 or at least one of the clearance coating properties, the edge anticorrosion properties and the finish properties is C.

INDUSTRIAL APPLICABILITY

The present invention can provide coated articles excellent in the clearance coating properties, the edge anticorrosion properties, and the finishing properties.

The invention claimed is:

1. A cationic electrodeposition paint composition comprising:
   an amino group-containing epoxy resin;
   a blocked polyisocyanate obtained by reacting a polyisocyanate compound and an active hydrogen-containing component containing propylene glycol; and
   a cationic electrodepositing gelled microparticulate polymer, wherein:
   the amino group-containing epoxy resin is a polyol-modified amino group-containing epoxy resin obtained by reacting a polycaprolactone polyol compound and an amino group-containing compound with a modified epoxy resin,
   the modified epoxy resin is obtained by adding caprolactone to a hydroxyl group-containing epoxy resin,
   the cationic electrodepositing gelled microparticulate polymer is obtained by crosslinking an acrylic copolymer containing a hydrolyzable alkoxysilane group and a cationic group; and
   a blending ratio of the cationic electrodepositing gelled microparticulate polymer in the cationic electrodeposition paint composition is, in terms of a solid content ratio, from 0.1 to 20 parts by mass relative to total 100 parts by mass of the amino group-containing epoxy resin and the blocked polyisocyanate compound.

2. The cationic electrodeposition paint composition according to claim 1, wherein an organic solvent amount in a cationic electrodeposition paint composition bath is from 1.4 to 2.3% by mass.

3. The cationic electrodeposition paint composition according to claim 1, wherein:
   a dry film thickness is denoted by M1 when electrodeposition coating is performed using a bath of the cationic electrodeposition paint composition under conditions of a bath temperature of 28° C., an applied voltage of 200 V and a time of 3 minutes, and
   a dry film thickness is denoted by M2 when electrodeposition coating is performed using the bath of the cationic electrodeposition paint composition under conditions of the bath temperature of 40° C., the applied voltage of 200 V and the time of 3 minutes, and
   a film thickness difference between the dry film thickness M2 and the dry film thickness M1 is 15 μm or less.

4. A coated article obtained by electrodeposition coating using a bath of the cationic electrodeposition paint composition according to claim 1.

5. A method for forming a cationic electrodeposition coating film, comprising the steps of:
  immersing an object to be coated in an electrodeposition bath including the cationic electrodeposition paint composition according to claim 1; and
  supplying power using the object to be coated as a cathode.

6. A coated article for which a coating film is formed by the method according to claim 5.

\* \* \* \* \*